US011702866B2

(12) United States Patent
Fraiman et al.

(10) Patent No.: US 11,702,866 B2
(45) Date of Patent: Jul. 18, 2023

(54) SYSTEM FOR DISPLAYING A PORTABLE ARTICLE

(71) Applicant: SE-KURE CONTROLS, INC., Franklin Park, IL (US)

(72) Inventors: Lazaro Fraiman, Skokie, IL (US); John W. Manser, Elgin, IL (US); David M. Adams, Stone Park, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 200 days.

(21) Appl. No.: 17/306,284

(22) Filed: May 3, 2021

(65) Prior Publication Data

US 2022/0325561 A1  Oct. 13, 2022

Related U.S. Application Data

(60) Provisional application No. 63/172,496, filed on Apr. 8, 2021.

(51) Int. Cl.
*E05B 73/00* (2006.01)
*A47F 5/04* (2006.01)
*H04B 1/3877* (2015.01)

(52) U.S. Cl.
CPC .............. *E05B 73/00* (2013.01); *A47F 5/04* (2013.01); *H04B 1/3877* (2013.01)

(58) Field of Classification Search
CPC .......... E05B 73/00; A47F 5/04; H04B 1/3877
See application file for complete search history.

(56) References Cited

U.S. PATENT DOCUMENTS

| 8,711,553 | B2* | 4/2014 | Trinh ................. E05B 73/0082 |
| | | | 361/679.02 |
| 8,789,800 | B2* | 7/2014 | Liu ....................... F16M 13/00 |
| | | | 248/316.4 |
| 9,097,380 | B2* | 8/2015 | Wheeler ............ E05B 73/0017 |
| 9,194,532 | B2* | 11/2015 | Bisesti ..................... A47F 7/024 |
| 9,285,832 | B2* | 3/2016 | Galant .................... G06F 21/88 |
| 10,165,873 | B2* | 1/2019 | Gulick, Jr. .......... E05B 73/0082 |
| 10,623,038 | B2 | 4/2020 | Leyden et al. |
| 10,750,885 | B2 | 8/2020 | Hyma et al. |
| 11,015,626 | B2 | 5/2021 | Leyden et al. |
| 11,448,356 | B2* | 9/2022 | Horvath ................ F16M 13/02 |
| 2013/0075544 | A1* | 3/2013 | Liu ....................... F16M 13/00 |
| | | | 248/122.1 |
| 2019/0309897 | A1* | 10/2019 | Ehlis Pirretas ..... B60R 11/0241 |

(Continued)

*Primary Examiner* — Anita M King
(74) *Attorney, Agent, or Firm* — Wood, Phillips, Katz, Clark & Mortimer

(57) ABSTRACT

A support assembly for displaying a portable article having a frame to engage the portable article and a blocking assembly configured with a plurality of arms to maintain the portable article in a display position on the frame. One of the arms is part of a first component. At least a first connector on the first component and at least a first connector on the frame are configured so that the first component can be moved in a first direction: a) from a pre-assembly position, spaced from the frame, towards the frame; and b) into an operative position to thereby cause the at least first connector on the first component to engage the at least first connector on the frame. In the operative position, the first component is substantially blocked from translating relative to the frame in a direction transversely to the first direction.

21 Claims, 10 Drawing Sheets

(56) References Cited

U.S. PATENT DOCUMENTS

2019/0350102 A1  11/2019 Leyden et al.
2020/0107653 A1* 4/2020 Leyden .................... F16B 2/12
2021/0230910 A1* 7/2021 Schutt ..................... E05B 73/00

* cited by examiner

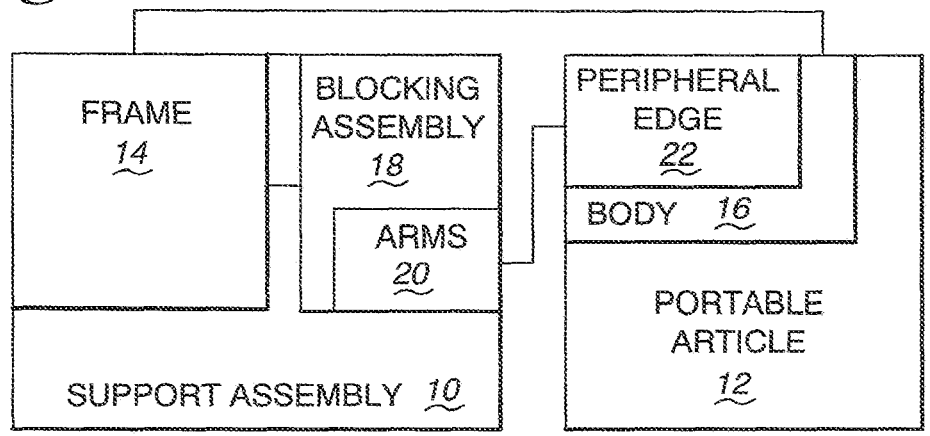
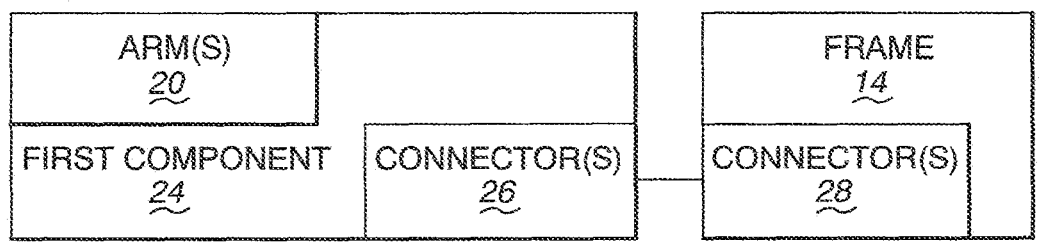
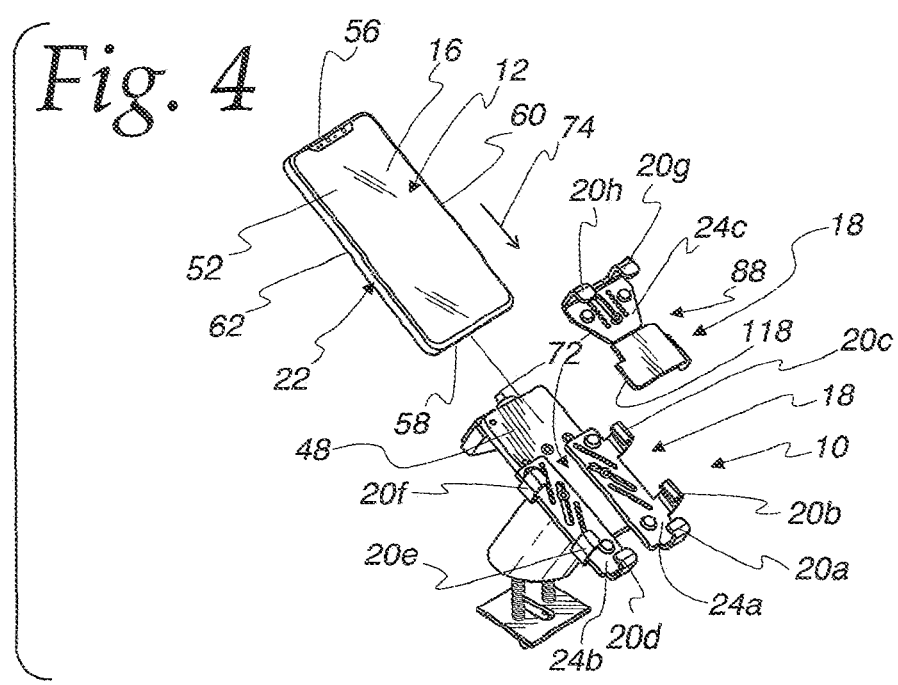

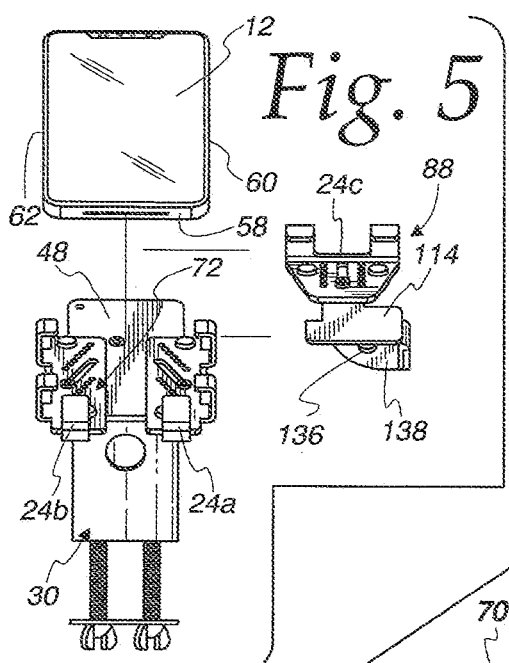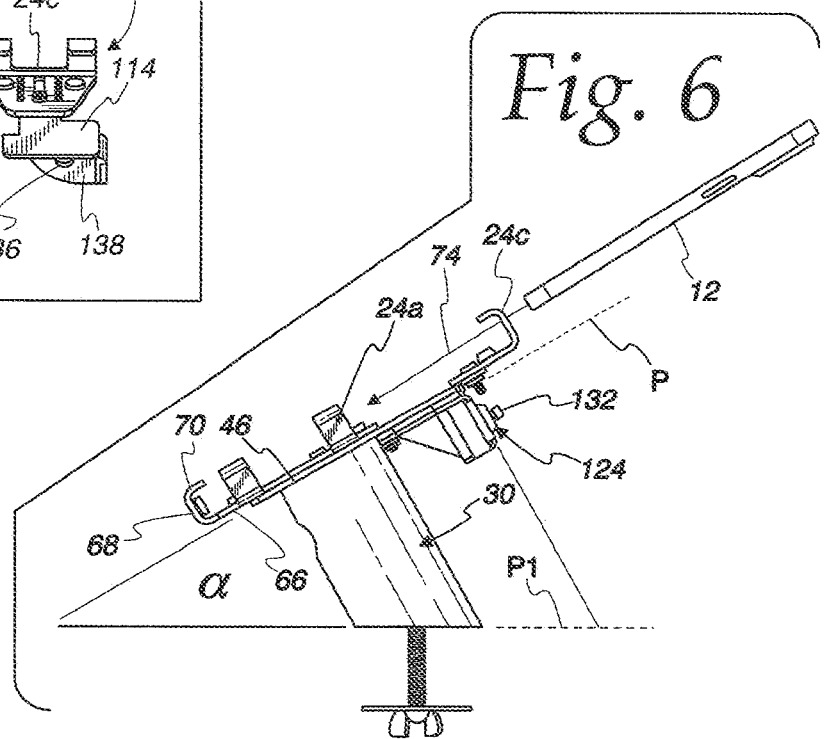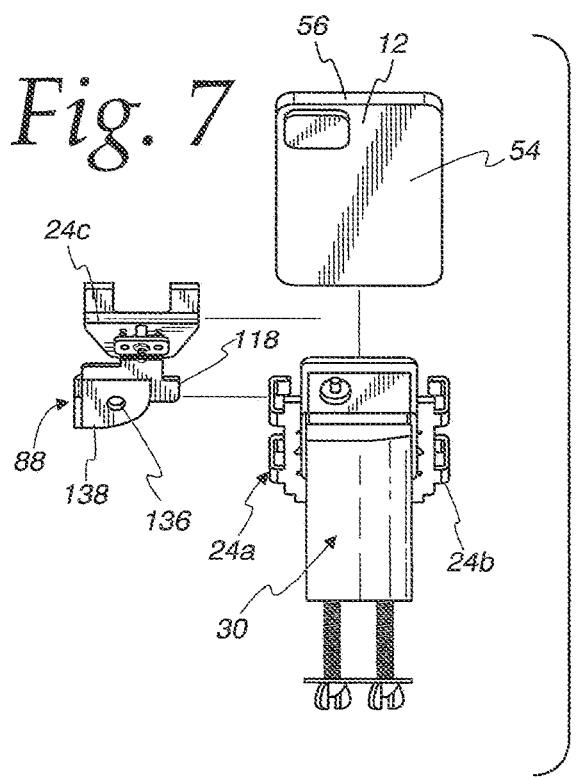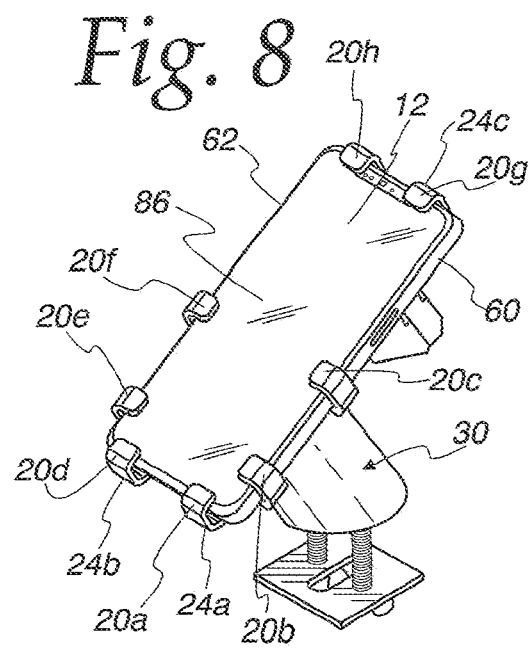

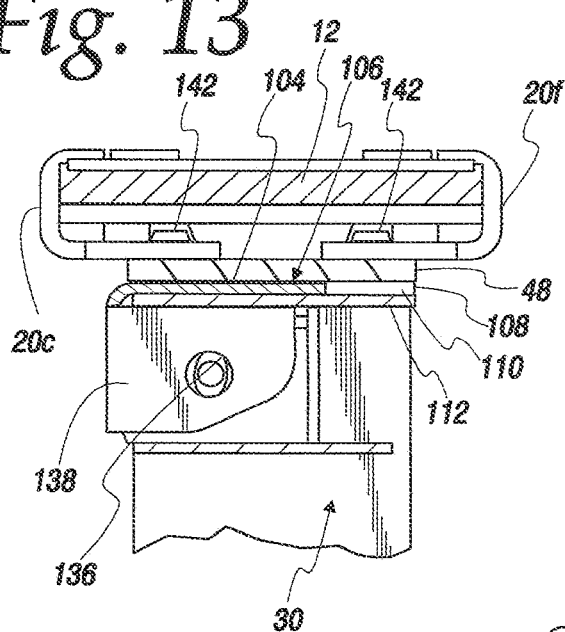
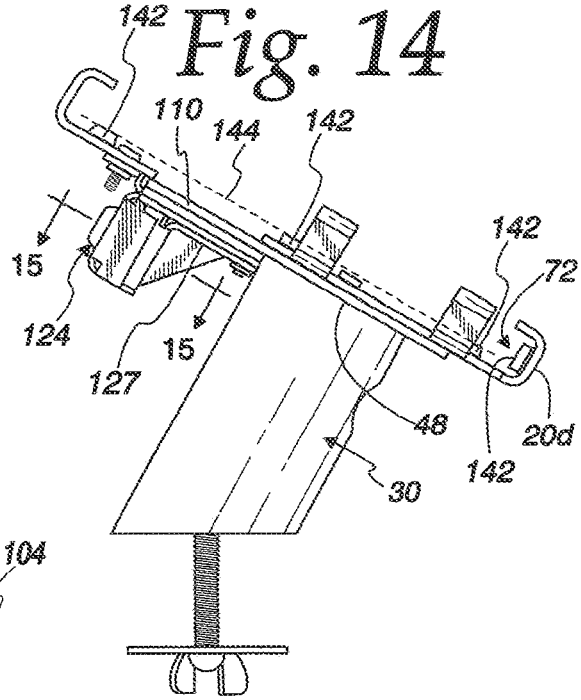
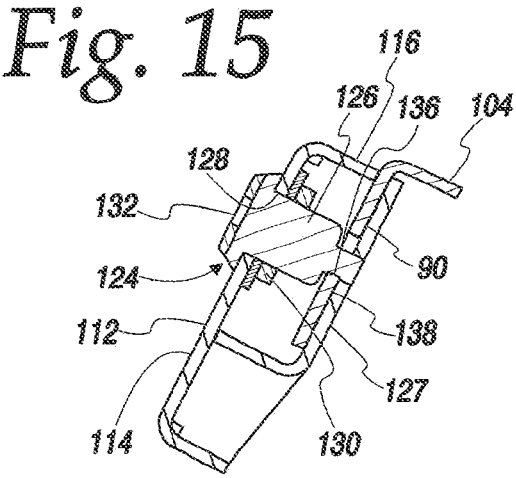

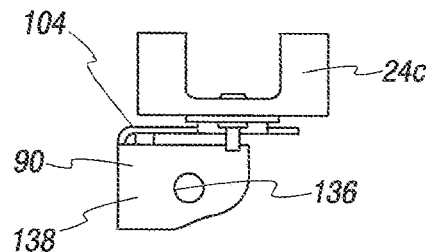
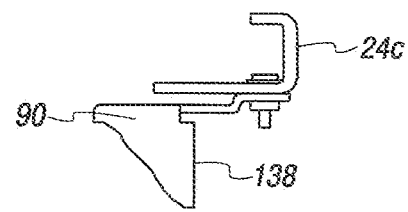
Fig. 20  Fig. 21
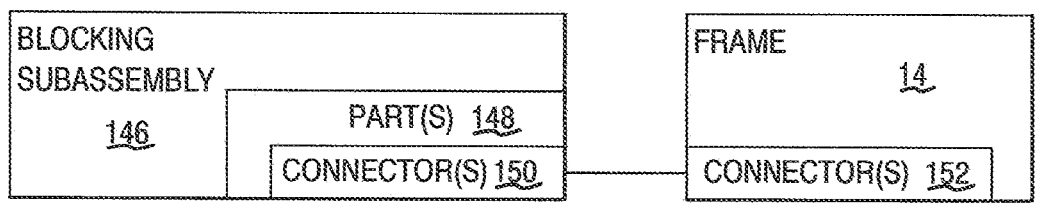
Fig. 23

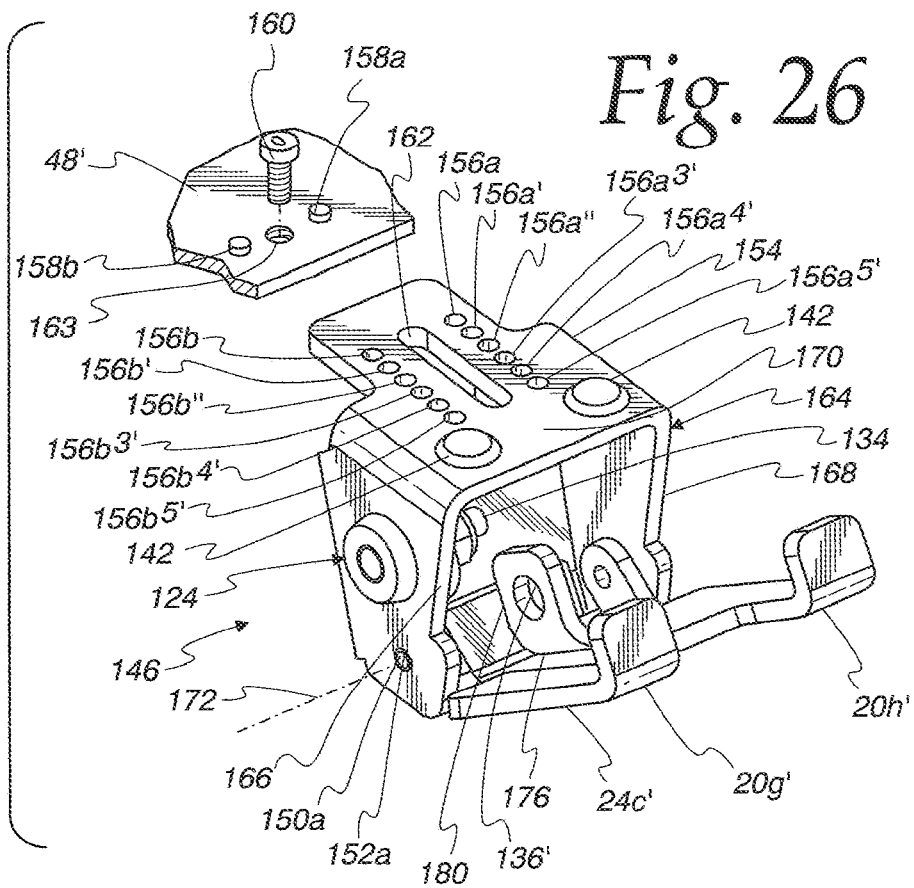
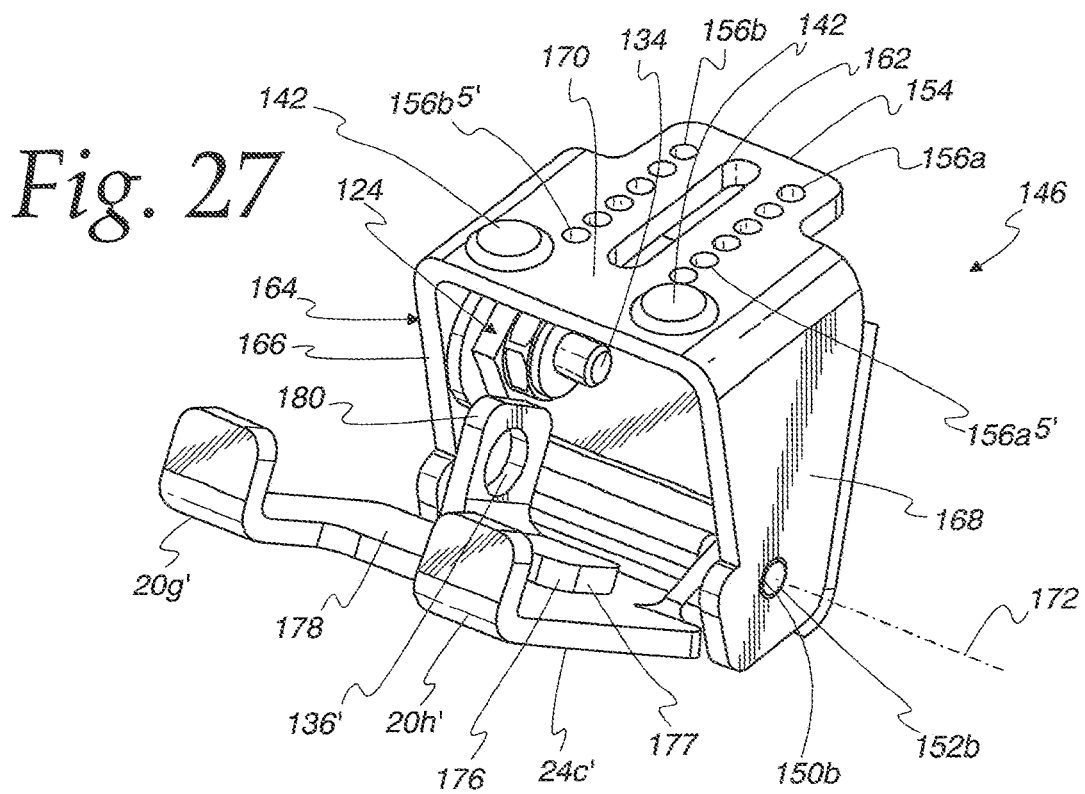

SYSTEM FOR DISPLAYING A PORTABLE ARTICLE

CROSS-REFERENCE TO RELATED APPLICATIONS

This is a non-provisional application claiming priority to U.S. Provisional Application No. 63/172,496, filed Apr. 8, 2021, which is incorporated herein by reference.

BACKGROUND OF THE INVENTION

Field of the Invention

This invention relates to portable articles, such as electronic articles, and, more particularly, to a system for securely displaying such articles, as at a point of purchase location.

Background Art

A multitude of portable electronic articles are displayed in different businesses worldwide in a manner that allows potential purchasers to inspect, and typically operate, the articles. A large percentage of these articles are in the smartphone and tablet category. The invention herein is not specifically limited to this category, but the prior art and invention herein will be described in relationship thereto, as but one relevant category.

There are many objectives designers of such displays strive to achieve. First and foremost, the display must present articles in a manner that caters to the needs of the potential purchasers.

Every business wishes to make its displays as aesthetically pleasing as possible so that consumers are comfortable in the display environment.

Given the high cost of the above category of articles, and the multitude of options available, in terms of models and manufacturers, it is important to be able to display these articles efficiently from a space standpoint while allowing convenient access to, and inspection by, consumers.

A common design for such display systems utilizes a pedestal, and a base on the pedestal, upon which the back walls of the articles are placed to be supported in a display position, typically angled to situate screen displays for optimal viewing. Various hold-down mechanisms have been devised to securely maintain each article against the base while not obstructing the article screen display or its controls, whereby potential purchasers are allowed to operate the article and observe the screen display.

Given the number of different configurations and sizes of the articles in this category, and the need to periodically interchange them, these displays have commonly been made with an adjusting capability so that a single design can accommodate articles with several different geometries. Generally, this adjusting capability involves moving a series of arms laterally and vertically to captively engage the article housing, with portions of the arms generally overlying a front surface of the article adjacent the peripheral edge. Different mechanisms have been devised to fix the arms once a displayed article is in the desired captive state.

One common design uses arms, individually or in multiples, on plates, that are movable guidingly relative to the base in a predetermined manner. This allows adjustment of width and height of the receptacle for the article within predetermined ranges.

One particular problem with this design is that it relies on the display overseer to reposition the arms properly, and fix them, so that the article is, in fact, securely captively held. In large display settings, a number of articles may have to be set up at any given time, which may result in inconsistent setting of the arms, from one article display location to the next, before they are tightened. This may lead to improperly secured articles which are susceptible to being easily separated, or wedged away, from the display system.

Generally, persons delegated the responsibility of setting up these displays are focused primarily on consummating sales. Thus, often adequate care may not be taken to assure that all articles are properly secured.

Security systems themselves represent a significant investment. If they are compromised by reason of improper setup, often manufacturers of the systems are wrongly identified as the cause of system breaches. This may result in the rejection of a certain manufacturer's products or a decision to assume more risk and make a smaller investment in security, as a result of which the losses associated with theft may eventually skyrocket.

Thus, it is in the interest of both the supplier of security systems, and the businesses that use such systems, to have available a system that controls theft adequately to justify investment, is user friendly in terms of allowing easy and efficient setup, and can be consistently set up to reliably secure the articles which it is designed to display. Many currently existing display systems are deficient in one or more of the above areas.

SUMMARY OF THE INVENTION

In one form, the invention is directed to the combination of: a) a portable article having a body with a peripheral edge; and b) a support assembly for displaying the portable article. The support assembly includes: a frame configured to engage the body so as to support the portable article in a display position; and a blocking assembly configured to maintain the portable article in the display position. The blocking assembly has a plurality of arms which, with the support assembly in a secured state, cooperatively confine movement of the portable article in the display position relative to the frame. One of the arms is part of a first component. There is at least a first connector on the first component and at least a first connector on the frame. The at least first connector on the first component and the at least first connector on the frame are configured so that the first component can be moved in a first direction: a) from a first pre-assembly position, spaced from the frame, towards the frame; and b) into a first operative position to thereby cause the at least first connector on the first component to engage the at least first connector on the frame. The first component, including the at least first connector on the first component, and the frame, including the at least first connector on the frame, are configured so that as an incident of the first component moving from the first pre-assembly position into the first operative position, the first component is substantially blocked from translating relative to the frame in a direction transversely to the first direction.

In one form, the first component, including the at least first connector on the first component, and the frame, including the at least first connector on the frame, are configured so that as an incident of the first component moving from the first pre-assembly position into the first operative position, the first component is substantially blocked from moving relative to the frame other than by moving the first component relative to the frame oppositely to the first direction.

In one form, the combination further includes at least one fastener for fixing the first component in the first operative position relative to the frame.

In one form, the one fastener has an operating portion that is blocked by the portable article with the portable article in the display position.

In one form, the first connector on the frame is one of a first post and a first receptacle. The first connector on the first component is the other of a first post and a first receptacle. The first post moves into the first receptacle as an incident of the first component moving from the first pre-assembly position into the first operative position.

In one form, the plurality of arms includes a second arm that is spaced laterally from the one arm with the support assembly in the secured state. The at least first connector on the frame consists of first and second posts. The at least one connector on the first component consists of first, second, third, and fourth receptacles. The support assembly is configured so that as an incident of the first component moving from the first pre-assembly position into the first operative position the first and second posts move one each into the first and second receptacles. The first component in the first operative position is substantially blocked from moving relative to the frame other than by translating the first component relative to the frame oppositely to the first direction. The one and second arm are spaced laterally from each other a first distance. As an incident of the first component moving from a second pre-assembly position, spaced from the frame, towards the frame, the first and second posts move one each into the third and fourth receptacles wherein the first component is in a second operative position. The first component in the second operative position is substantially blocked from moving relative to the frame other than by moving the first component relative to the frame in a direction opposite to a direction the first component moves from the second pre-assembly position into the second operative position. With the first component in the second operative position, the one and second arm are spaced laterally from each other a second distance different than the first distance.

In one form, the plurality of arms include a plurality of arms on the first component.

In one form, the peripheral edge on the portable article includes first and second transverse edge portions. The plurality of arms on the first component include a first arm with a surface that faces one of the first and second transverse edge portions and a second arm with a surface that faces the other of the first and second transverse edge portions.

In one form, the portable article has a front surface. The first and second of the plurality of arms each has a portion that overlies the front surface on the portable article.

In one form, the support assembly includes a second component. One of the arms is part of the second component. There are cooperating connectors on the second component and frame that are configured to be engaged by moving the second component from a pre-assembly position towards the frame as an incident of which the second component realizes an operative position. The second component, the frame, and the cooperating connectors on the frame and second component are configured so that with the second component in its operative position the second component is substantially blocked from moving relative to the frame other than by moving the second component in a direction opposite to a direction the second component moves from its pre-assembly position into its operative position.

In one form, the second component has the same construction as the first component. The first and second components are mirror images of each other.

In one form, the frame has a pedestal and defines a surface against which a back surface of the portable article is placed to support the portable article in the display position.

In one form, the support assembly has a plurality of resilient members that cooperatively define the frame surface against which the back surface of the portable article is placed with the portable article in the display position.

In one form, the portable article has a top and bottom and laterally spaced sides. The support assembly has a blocking subassembly with another component. One of the arms is on the another component. There are cooperating connectors on the blocking subassembly and frame that guide relative movement between the frame and blocking subassembly as the blocking assembly is moved from a pre-assembly position into an operative position. The one arm on the another component resides at one of the top and bottom of the portable article with the portable article in the display position.

In one form, the pre-assembly position for the blocking subassembly is fully spaced from the frame.

In one form, with the portable article in the display position, the blocking subassembly is guidingly moved in a lateral direction in moving between the pre-assembly and operative positions for the blocking subassembly.

In one form, the support assembly further includes a locking assembly that has locked and unlocked states. With the blocking subassembly in its operative position and the locking assembly changed from the unlocked state into the locked state, the blocking subassembly is fixed in its operative position.

In one form, the blocking subassembly has a base to which the another component is mounted. There are cooperating connectors on the base and the another component that allow the another component to be maintained in a plurality of different relative positions in which the one arm has different relationships with the one of the top and bottom of the portable article in the display position.

In one form, the cooperating connectors consist of a post on one of the base and the another component and a receptacle for the post on the other of the base and the another component.

In one form, the other of the base and the another component has a plurality of receptacles for the post into which the post can be selectively directed to allow selection of different relative positions between the base and the another component.

In one form, the invention is directed to the support assembly for displaying a portable article as described above.

BRIEF DESCRIPTION OF THE DRAWINGS

FIG. 1 is a schematic representation of a support assembly, according to the present invention, in relationship to a portable article which can be placed in a display position on the support assembly;

FIG. 2 is a schematic representation of additional details of the relationship between part of a blocking assembly and a frame on the support assembly in FIG. 1;

FIG. 4 is a perspective view of the support assembly in FIG. 3 wherein a blocking subassembly is in a pre-assembly position relative to the frame and with a portable article, in the form of a smartphone, being directed towards a display position on the support assembly;

FIG. 5 is a view of the components, as in FIG. 4, from a front perspective;

FIG. 6 is a view of the components, as in FIG. 4, from a side perspective;

FIG. 7 is a view of the components, as in FIG. 4, from a rear perspective;

FIG. 8 is a perspective view of the components in FIG. 4 wherein the portable article is in a display position, the blocking subassembly is moved into an operative position, and the support assembly is in a secured state;

FIG. 13 is an enlarged, cross-sectional view of the support assembly and portable article taken along line 13-13 of FIG. 12;

FIG. 14 is a view as in FIG. 12 with the portable article removed;

FIG. 15 is an enlarged, cross-sectional view of a part of the support assembly taken along line 15-15 of FIG. 14;

FIG. 20 is a rear elevation view of the blocking subassembly in FIG. 19;

FIG. 21 is a side elevation view of the blocking subassembly in FIG. 19;

FIG. 23 is a schematic representation showing alternative forms of blocking subassembly usable with the inventive support assembly;

FIG. 26 is an enlarged, perspective view of the blocking subassembly in FIGS. 24 and 25 and with the component in the FIG. 24 position;

FIG. 27 is view of the blocking subassembly in FIG. 26 taken from a different perspective.

DETAILED DESCRIPTION OF THE PREFERRED EMBODIMENT

Figure 3:
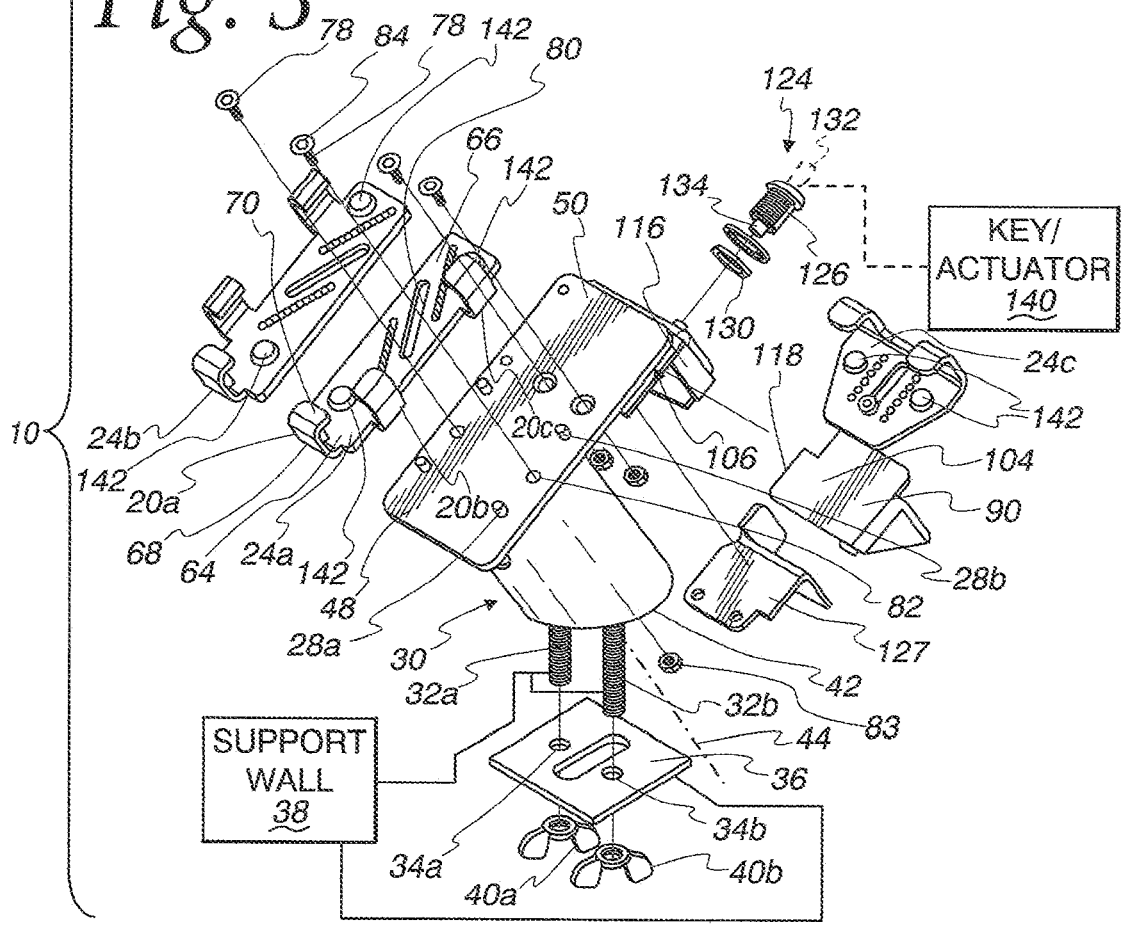
FIG. 3 is an exploded perspective view of one exemplary form of the inventive support assembly, as shown schematically in FIGS. 1 and 2.

As shown schematically in FIG. 1, the invention herein is directed to a support assembly at 10 for maintaining a portable article 12 in a display position on the support assembly 10. The portable article 12 may be any type of portable article that is commonly displayed for inspection, as at point-of-purchase locations in businesses. As indicated above, the invention herein will be described with respect to electronic portable articles 12 in the category of smartphones, tablets, etc. This exemplary use should not be viewed as limiting.

The support assembly 10 has a frame 14 configured to engage a body 16 on the portable article 12 so as to support the portable article 12 in the display position therefor. The support assembly 10 further includes a blocking assembly 18 configured to maintain the portable article 12 in the display position on the frame 14.

The blocking assembly has a plurality of arms 20 which, with the support assembly 10 in a secured state, cooperatively confine movement of the portable article 12 in the display position relative to the frame 14.

Commonly, the arms 20 will cooperate with the body 16 of the displayed portable article 12 by each being at or adjacent a peripheral edge 22 on the body 16.

The frame 14 and blocking assembly 18 cooperatively define a receptacle for the portable article 12. The relative position of the arms 20 is changeable to change the shape and/or size of the receptacle to accommodate different portable article configurations. It should be noted that the concepts described below could also be practiced to make a receptacle wherein one or more parts bounding the receptacle are fixed.

To accomplish the above, as shown in FIG. 2, at least one of the arms 20 is part of a first component 24. At least a first connector 26 is provided on the first component 24. At least a first connector 28 is provided on the frame 14.

The at least first connector 26 on the first component 24 and the at least first connector 28 on the frame 14 are configured so that the first component can be moved in a first direction: a) from a first pre-assembly position, spaced from the frame 14, towards the frame 14; and b) into a first operative position to thereby cause the at least first connector 26 on the first component 24 to engage the at least first connector 28 on the frame 14. As an incident of the first component moving from the first pre-assembly position into the first operative position, the first component 24 is substantially blocked from translating relative to the frame 14 in a direction transversely to the first direction.

Accordingly, a press fit arrangement exists wherein the first component 24 can be pressed onto the frame 14 to assume its first operative position, whereupon the first component might pivot but is not allowed to otherwise translatingly move against, and relative to, the frame 14.

More preferably, the connectors 26, 28 cooperate so that the first component 24, once placed in the first operative position, is substantially precluded from moving relative to the frame 14 other than by reversing the press fit assembly step and moving the first component from the first operative position in a direction opposite to the first direction relative to the frame 14.

The operative relationship for the first component 24 described in the preceding paragraph may be achieved by providing cooperating connectors 26, 28, one each on the first component 24 and frame 14, or by providing multiple cooperating pairs of connectors 26, 28. The precise form of the connectors 26, 28 that allows the press fit connection is not limited to the specific forms as hereinbelow described.

Further, by having multiple connectors 26, 28 on one or both of the first component 24 and frame 14, the first component 24 may be press fit into different operative positions on the frame 14 which may allow one or more dimensions of the receptacle defined for the portable article 12 in its display position to be altered.

Further, the invention contemplates that any number of components, corresponding to the first component 24, may be employed, each with one or more associated arms, whereby one or more of the components may be placed in different operative positions and/or the components may be interchangeably mounted, with one used in place of the other. By keeping multiple components on hand, the display operator may be able to select from different components making up a kit and/or use the same components arranged on the frame 14 in different manners. As one example, components dimensioned to handle a larger, tablet configuration may be substituted. By keeping on hand alternative sizes and shapes of components, greater versatility with a single support assembly is offered at each display location.

The schematic depictions in FIGS. 1 and 2 are intended to encompass virtually an unlimited number of different configurations of each of the components shown therein as well as their cooperation. The specific forms described hereinbelow are but examples within the generic showing and should not be viewed as limiting.

Referring now to FIGS. 3-22, one form of the inventive support assembly 10 is shown in combination with a portable article 12 in the form of a smartphone.

The frame 14 has an elongate pedestal 30 with downwardly projecting threaded posts 32a, 32b which are aligned to pass through openings 34a, 34b, respectively, in a retainer plate 36. To anchor the pedestal 30, the threaded posts 32a, 32b are directed through a support wall 38 from one side thereof whereby the free ends thereof project from an opposite side of the support wall 38. The retainer plate 36 can be placed against the opposite side of the support wall 38 with the free ends of the threaded posts 32a, 32b projecting through the openings 34a, 34b to be threadably engaged by, in this case, wingnuts 40a, 40b. By tightening the nuts 40a, 40b, a bottom edge 42 of the pedestal 30 is drawn against the one side of the support wall 38 to thereby stably anchor the pedestal 30. Any other form of tightening nut might be utilized. Further, the pedestal might be anchored at a desired location by other types of similar, or different structures, known or devisable, by those skilled in the art.

The bottom edge 42 is at an angle to the lengthwise axis 44 of the pedestal 30 whereby the plane P of a top edge 46 of the pedestal 30, that is orthogonal to the axis 44, is angled to horizontal. As shown in FIG. 6, the angle α that the plane of the top edge 46 makes to a horizontal plane P1, represented by the surface of the support wall 38 against which the pedestal 30 is held, is on the order of 30° as depicted, with there being no criticality to this angle.

A flat, support plate 48 is fixed at the upper edge 46 of the pedestal to define a front mounting surface 50 at the angle α to horizontal.

While the precise number of arms utilized on the blocking assembly 18 is not critical, in this design there are eight arms 20a, 20b, 20c, 20d, 20e, 20f, 20g, and 20h.

The depicted portable article 12 has a body 16 with a flat front surface 52, a flat rear surface 54, and a peripheral edge 22 therebetween. The peripheral edge 22 consists of parallel top and bottom edge portions 56, 58 and laterally opposite, parallel, side edge portions 60, 62. Adjacent edge portions 56, 58, 60, 62 are substantially straight and transverse to each other, in this case substantially orthogonally related, to produce the rectangular shape depicted with a longer top-to-bottom dimension and shorter side-to-side dimension.

Figure 9:
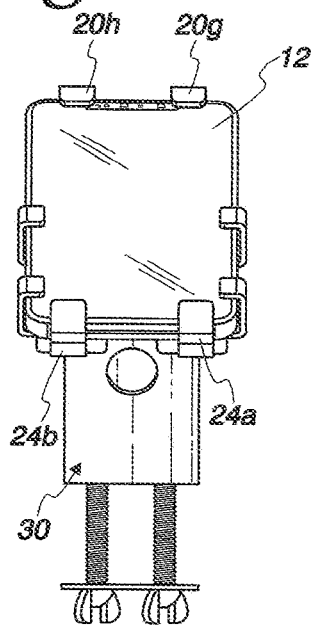
FIG. 9 is a view of the components, as in FIG. 8, from a front perspective.
Figure 10:
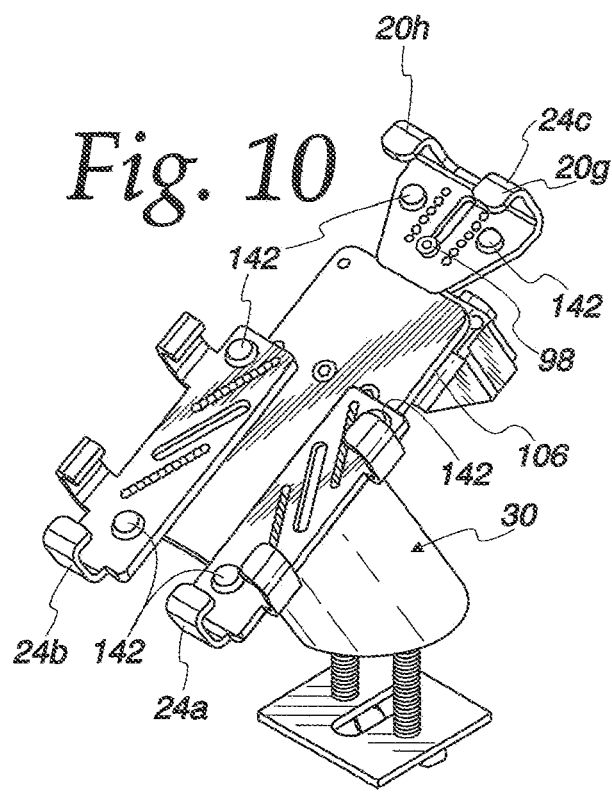
FIG. 10 is a view as in FIG. 8 with the portable article separated from the support assembly.
Figure 12:
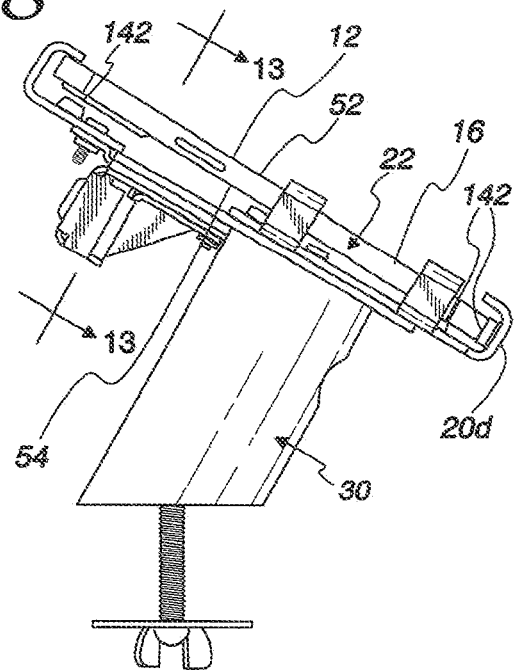
FIG. 12 is a side elevation view of the components in FIG. 9.
Figure 17:
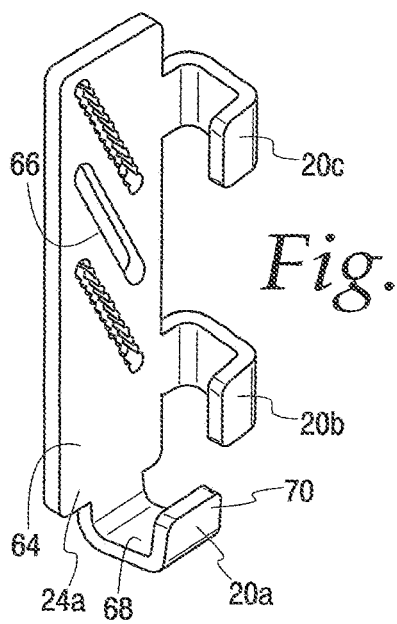
FIG. 17 is an enlarged, perspective view of a component on the blocking assembly on the support assembly in FIG. 3 used to maintain a portable article in a display position.
Figure 16:
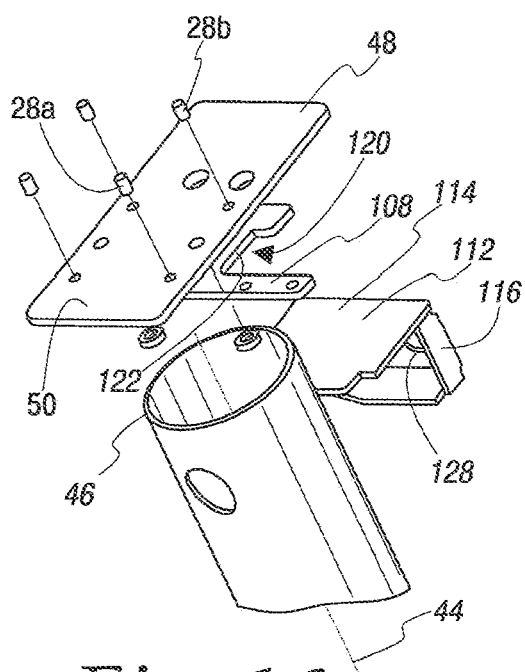
FIG. 16 is an exploded, fragmentary, perspective view of the frame on the support assembly in FIG. 3.
Figure 18:
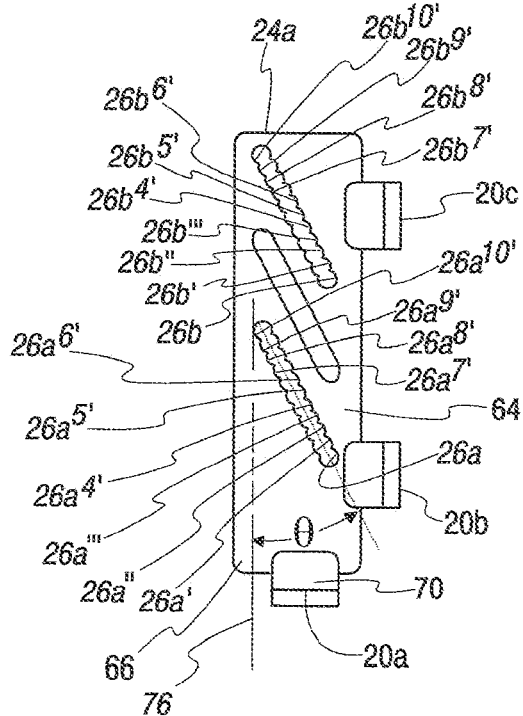
FIG. 18 is a front elevation view of the component in FIG. 17.
Figure 19:
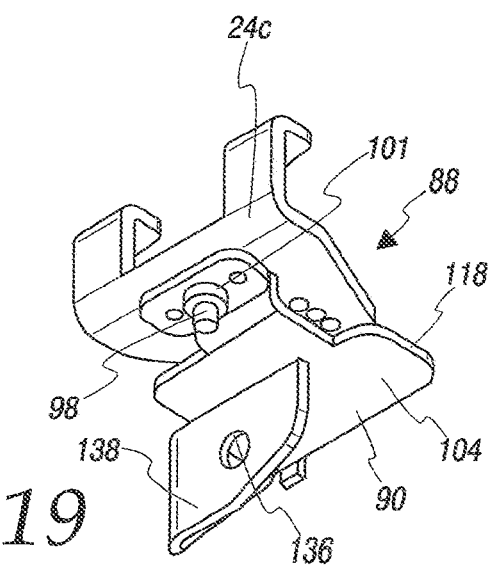
FIG. 19 is an enlarged, perspective view of the blocking subassembly making up part of the blocking assembly that maintains the article in a display position.

With the portable article in the display position of FIGS. 8, 9, and 12, two arms 20 reside at each edge portion 56, 58, 60, 62.

In this embodiment, there are at least two components 24a, 24b each corresponding to the first component 24 shown schematically in FIG. 2. The exemplary component 24a has a body 64 which has a flat anchoring portion 66 that is formed as one piece with three of the arms 20a, 20b, 20c. The arms 20a, 20b, 20c, as all arms 20 herein, could be made as components separate from their respective anchoring portion.

The exemplary arm 20a has a blocking part 68 projecting substantially orthogonally away from the plane of the anchoring portion 66 and a return bent portion 70 whereby the flat anchoring portion 66, blocking part 68, and return bent portion 70 cooperatively define a "U" shape, as clearly seen in FIG. 6, into which the bottom edge portion 58 on the portable article 12 nests with the portable article in the display position.

The arms 20b, 20c are similarly configured, each to define a "U" shape in conjunction with the anchoring portion 66, which receive the side peripheral edge portion 60 of the article 12.

While not required, in the form depicted, the component 24b has essentially the same construction as the component 24a but is made as a mirror image thereof on opposite sides of a top-to-bottom line between the parts 24a, 24b. The component 24b interacts with the frame 14 in the same manner that the component 24a interacts with the frame 14. Thus there is no need to describe herein the corresponding structure on the component 24b.

With the components 24a, 24b in one of their respective operative positions, as seen in exemplary FIGS. 4-6, they are in fixed relationship to each other and the frame 14 such that the arms 20a, 20b, 20c, 20d, 20e, 20f cooperatively define a U-shaped receptacle 72 that functions much as an open envelope into which the lower region of the article can be advanced by being aligned in the FIG. 4 position and translated in the direction of the arrow 74. Once fully in the receptacle 72, as seen in exemplary FIGS. 8 and 9, the article 12 is in the aforementioned display position.

In this embodiment, the press fit capability is incorporated by making the frame 14 with two of the connectors 28a, 28b and the component 24 with multiple connectors 26a, 26a', 26a'', 26a''', $26a^{4'}$, $26a^{5'}$, $26a^{6'}$, $26a^{7'}$, $26a^{8'}$, $26a^{9'}$, $26a^{10'}$ and 26b, 26b', 26b'', 26b''', $26b^{4'}$, $26b^{5'}$, $26b^{6'}$, $26b^{7'}$, $26b^{8'}$, $26b^{9'}$, $26b^{10'}$ that cooperate respectively with the connectors 26a, 26b on the frame 14.

Each of the connectors $26a$-$26a^{10'}$ is in the form of a round receptacle/opening that is complementary to the connector 28a, which is in the form of a cylindrically-shaped projecting post. Complementary shapes are not limited to round as depicted. The connectors $26a$-$26a^{10'}$ while in communication with each other, are discrete structures wherein the post 28a must be pressed into each opening $26a$-$26a^{10'}$ individually and cannot be translated from one opening to the next. Rather, the component 24a in one operative position must be translated away from the frame 14 to assume the aforementioned pre-assembly position, shifted, and then translated to cause the connector 28a to be advanced into another of the openings 26.

The post 28b cooperates with the openings $26a$-$26a^{10'}$ in the same manner.

The openings $26a$-$26a^{10'}$ and $26b$-$26b^{10'}$ are arranged so that the posts 28a, 28b align selectively with openings 26a, 26b; 26a', 26b'; 26a", 26b"; 26a''', 26b'''; $26a^{4'}$, $26b^{4'}$; $26a^{5'}$, $26b^{5'}$; $26a^{6'}$, $26b^{6'}$; $26a^{7'}$, $26b^{7'}$; $26a^{8'}$, $26b^{8'}$; $26a^{9'}$, $26b^{9'}$; and $26a^{10'}$, $26b^{10'}$ to allow the component 24a to be placed in any of ten different operative positions. This precise number is not critical, however. The openings $26a$-$26a^{10'}$ and $26b$-$26b^{10'}$ are each arranged in spaced, parallel lines that are at an angle θ to a top-to-bottom reference line 76.

Accordingly, with the connector/posts 28a, 28b in the openings 26a, 26b, respectively, the component 24a will be situated in an operative position wherein the receptacle 72 may have its smallest possible extension, to the right and downwardly, as viewed from a front perspective for the support assembly 10.

By drawing the component 24a away from this operative position on the frame 14 and thereby moving the posts 28a, 28b out of the openings 26a, 26b, the component 24a can be shifted to a second pre-assembly position, as wherein the posts 28a, 28b align with the openings 26a', 26b', respectively. By then translating the component 24a towards the frame 14 in a first direction, the posts 28a, 28b are advanced into the openings 26a', 26b', whereupon the component 24a is in a second operative position. In the second operative position, by reason of the angled relationship of the openings 26a, 26b, the component 24a is shifted upwardly and towards the left, which by itself shifts the boundary of the receptacle 72 to make the receptacle 72 shorter in both of these dimensions.

Accordingly, the component 24a can be simply press fit into one operative position, drawn away from that operative position, resituated, and press fit into another operative position which changes the dimensions of the receptacle 72. With the form depicted, once in the operative position, the component 24a can be moved relative to the frame only by reversing the press-fitting step and translating the component 24a oppositely to the first direction to away from the frame 14.

Once the desired operative position is selected, the component 24a can be fixed through an appropriate fastener 78 directed through an elongate slot 80 in the component 24a, parallel to and between the lines of the openings $26a$-$26a^{10'}$, $26b$-$26b^{10'}$, and anchored to the frame 14. The fastener 78 may be a conventional threaded fastener that is directed into a threaded bore 82 on the frame 14, as defined by a fixed nut 83. The fastener 78 has an operating portion at 84, engageable by an appropriate tool, which operating portion is blocked by the article 12 with the article 12 in its display position.

It should be noted that the post form may be included on the component 24a, with the cooperating openings on the frame 14. Alternatively, there may be a mixture of forms whereby there are openings and posts on one or both of the component 24a and frame 14.

Further, other forms of cooperating connectors might be utilized instead of, or together with, the structure depicted and described above. For example, as opposed to having separate post and opening arrangements, a part of the body 64 of the operatively positioned component 24a may be keyed to the frame 14, as at its perimeter or otherwise, to block movement of the component 24a relative to the frame 14, as parallel to the plane of the mounting surface 50.

As a further alternative, with the component 24a in its operative position using a single post and opening arrangement, that prevents translation of the component 24a relative to the frame 14 transversely to the line of press fitting, a separate fastener might be put in place to fix the component 24a against shifting parallel to the plane of the mounting surface 50.

As noted above, but not required, the component 24b in the depicted embodiment is the same as the component 24a, except being a mirror image thereof. The component 24b cooperates at the left side of the frame 14 in the same manner as the component 24a cooperates at the right side thereof. By making corresponding movements of the components 24a, 24b, the width of the receptacle 72 can be changed while maintaining the same vertical relationship between the arms 20a, 20b; 20b, 20e; 20c, 20f. A fastener 78 fixes the component 24b in the selected operative position.

Generally, with corresponding movements of the components 24a, 24b between different operative positions, the lateral distance between the arm pairs 20b, 20e and 20c, 20f changes. While the distance between these pairs is the same to accommodate a portable article with a square or rectangular configuration, other receptacle configurations could be formed.

In this embodiment, each arm 20 has a return bent portion corresponding to the return bent portion 70 on the arm 20a, which return bent portions have surfaces that overlie the front surface 52 of the portable article in the display position therefor, whereby the portable article in the display position is captively maintained against the frame 14, either loosely or tightly. Alternatively, the return bent portions could be eliminated or modified whereby the primary function of the arms 20 is to control shifting of the article 12 within the receptacle 72 relative to the frame 14.

The legs 20g, 20h are provided on an additional component 24c which is part of a blocking subassembly 88, that is in turn part of the blocking assembly 18. The component 24c is attached to a base 90. The component 24c has an anchoring portion 92 made as one piece with the arms 20g, 20h that are formed similarly as are the arms 20b, 20c associated with the anchoring portion 66 on the component 24a.

The base 90 has side-by-side connectors 94a, 94b, each in the form of an upwardly projecting, cylindrical post, anchored in the base 90. Parallel lines of receptacles/openings 96a, 96a', 96a", 96a''' $96a^{4'}$, $96a^{5'}$ and 96b, 96b', 96b", 96b''', $96b^{4'}$, $96b^{5'}$ are provided on the component 24a to receive the posts 94a, 94b. The precise number of receptacles/openings is not critical. Of course, this arrangement of connectors could be reversed. As with the prior press fit arrangement, the component 24c can be press fit to the base 90 by aligning the posts 94a, 94b with different pairs of receptacles 96a, 96b; 96a", 96b"; 96a''', 96b'''; $96a^{4'}$, $96b^{4'}$; $96a^{5'}$, $96b^{5'}$; and $96a^{6'}$, $96b^{6'}$. Changing the location of the component 24c on the base 90 changes the vertical position of the arms 20g, 20h relative to the frame 14 with the blocking assembly 18 in a secured state, as shown in FIGS. 8, 9, and 12, and thus the height of the receptacle 72.

Figure 22:
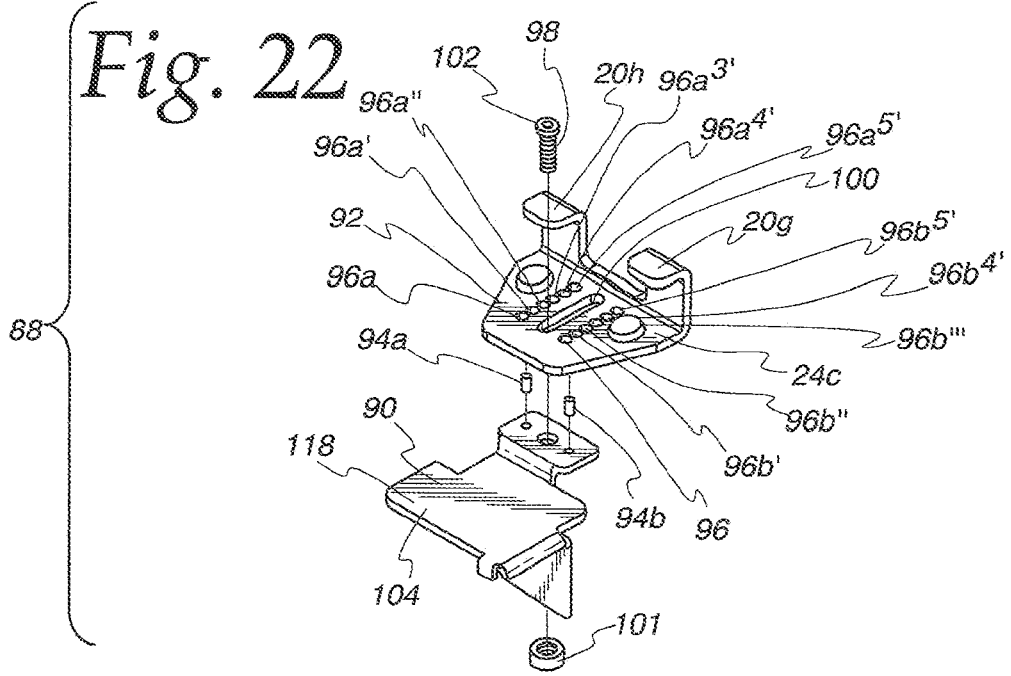
FIG. 22 is an exploded view of the blocking subassembly in FIGS. 19-21.
Figure 11:
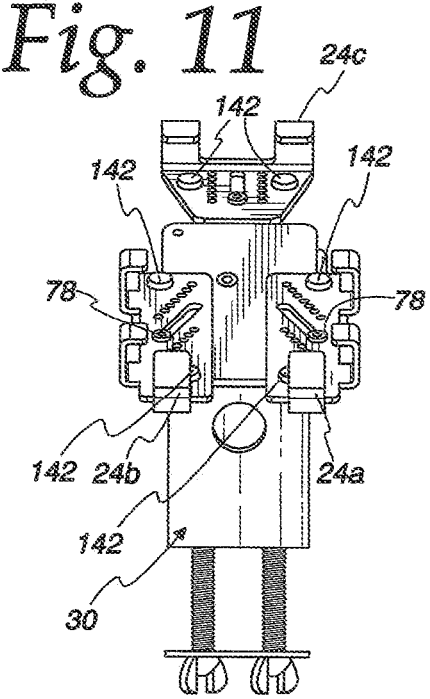
FIG. 11 is a view as in FIG. 9 with the portable article separated from the support assembly.

The component 24c can be advanced from a pre-assembly position, spaced form the base 90, as shown in FIG. 22, into an operative position as shown in exemplary FIG. 11. The pre-assembly and operative positions change depending upon how the connectors 94, 96 cooperate. With the component 24c in its operative position, it is blocked against movement relative to the base 90 other than by reversing the direction of translational movement in which the component 24c is advanced during assembly.

Once the operative position is realized, an appropriate fastener 98, shown as threaded, is directed through an elongate slot 100 in the component 24c, into the base 90, and fixed using a nut 101, which may be fixed to the base 90, to maintain the component 24c in its operative position.

An operating portion 102 on the fastener 98 is blocked by the article 12 in its display position.

The base 90 has a wall/connector 104 that cooperates with a slot/connector 106 on the frame. The wall 104 and slot 106 cooperate to guide the blocking subassembly 88 between a pre-assembly position as shown in FIG. 5, and an operative position, as shown in exemplary FIG. 11.

The slot 106 is defined by capturing a J-shaped spacer component 108, in the form of a flat plate 110, between the plate 48 defining the front mounting surface 50, and an underlying bracket 112. The bracket 112 has a flat wall 114 that bears against the spacer component 108 and a depending wall 116. The thickness of the component 108 determines the height of the slot 106, which is slightly greater than the thickness of the wall 104 on the base 90.

By aligning the blocking subassembly 88 in the pre-assembly position of FIG. 5, a narrowed leading end 118 on the wall 104 aligns with a complementary receptacle 120 defined by the component 108. The wall 104 is then stably guided between the plate 110 and wall 114 on the bracket 112 until the leading end 118 abuts to a base edge 122 bounding the receptacle 120. This consistently places the blocking subassembly 88 in its operative position wherein the arms 20g, 20h are respectively spaced equidistantly from the right and left side of the displayed article 12. Keying of the wall end 118 in the receptacle 120 blocks, or limits, shifting of the component 24c relative to the frame other than by reversing the assembly movement for the blocking subassembly 88.

With the portable article 12 in the display position and the blocking subassembly 88 in the operative position, surfaces on the arms 20 confront all of the peripheral edge portions 56, 58, 60, 62 on the portable article 12 to control shifting within the receptacle 72.

The operative position of the blocking subassembly 88 is maintained by a locking assembly at 124. The locking assembly 124 has a cylinder 126 that is directed through an opening 128 in the wall 116 of the bracket 112 and maintained in place by a nut 130 which threads to the periphery of the cylinder 126. A cover plate 127 shields a volume occupied by the cylinder 126 and reinforces the wall 116 supporting the cylinder 126.

In the form depicted, a push button actuator 132 can be pressed to advance a plunger 134 to change the locking assembly 124 from an unlocked state into a locked state. The plunger 134 aligns with an opening 136 in a wall 138 on the base 90 that depends from the wall 104, whereby with the blocking subassembly 88 in its operative position and the locking assembly 124 changed from the unlocked state into the locked state, the locking assembly causes the blocking subassembly 88 to be fixed in its operative position.

The locking assembly 124 may be constructed so that the locked state is maintained once the push button 132 is depressed. A key, or other type of actuator 140, is required to change the locking assembly from the locked state back into the unlocked state.

Resilient members 142 are provided, two on each of the components 24a, 24b, 24c, and cooperatively define a surface 144 against which the back/rear surface 54 of the portable article 12 is placed with the portable article 12 in the display position. This avoids having to rest the article on or against a rigid metal surface or a sharp edge and allows a slight compression of the members 142 that may result in a more stable positioning of the article in its display position. Like members 142 are provided, one each, on the arms 20a, 20d to abut the bottom edge portion 58 of the portable article 12 in the display position, as seen clearly in FIG. 25.

It should be understood that the location of the blocking subassembly 88 could be changed so that it resides to engage the bottom of the article—essentially involving inverting the structure carried on the pedestal from that depicted.

In an alternative form, a blocking subassembly, as shown schematically in FIG. 23 at 146, may be substituted for the blocking subassembly 88. The blocking subassembly 146 may have at least one part 148 that has at least one connector 150 that cooperates with at least one connector 152, fixed or supported on the frame 14, to allow the part(s) 148 to be guided in movement relative to the frame, as by pivoting or other type of movement between pre-assembly and operative positions, with the latter blocking withdrawal of the displayed article from the receptacle 72 defined by the remainder of the support assembly 10. The details of this alternative structure are not critical, as one skilled in the art could devise numerous different types of structure to be changed in state or reconfigured to selectively: a) allow the article 12 to be directed into the receptacle 72 into the display position and withdrawn from the display position; and b) block the portable article 12 in the display position with the blocking assembly 18 in the secured state.

One exemplary form of blocking assembly, as shown schematically at 146 in FIG. 23, is shown in FIGS. 24-27 on a modified form of support assembly 10'. The blocking subassembly 146 has a component 24c', corresponding to the component 24c and the part 148 shown schematically in FIG. 23. The component 24c' has arms 20g', 20h', corresponding to the arms 20g, 20h.

The component 24c' is maintained on a modified form of frame 14' through a mount component 154 that will, for purposes of simplicity, be considered to be a part of the frame 14'. The mount component 154 is configured to be press fit to a support plate 48', corresponding to but modified from, the support plate 48, in substantially the same way the component 24a, 24b are press fit to the support plate 48. That is, the mount component 154 has parallel lines of receptacles/openings $156a$, $156a'$, $156a''$, $156a^{3'}$, $156a^{4'}$, $156a^{5'}$; $156b$, $156b'$, $156b''$, $156b^{3'}$, $156b^{4'}$, $156b^{5'}$ with the lines of receptacles $156a$-$156a^{5'}$; $156b$-$156b^{5'}$ alignable respectively with posts 158a, 158b projecting upwardly from the support plate 48'. By pressing the posts 158a, 158b selectively into pairs of receptacles/openings $156a$, $156b$; $156a'$, $156b'$; $156a''$, $156b''$; $156a^{3'}$, $156b^{3'}$; $156a^{4'}$, $156b^{4'}$; and $156a^{5'}$, $156b^{5'}$, a desired top to bottom location for the press fit mount component 154 can be releasably established and fixed, as through a threaded fastener 160 that is directed through a slot 162 in the mount component 154 and into a threshold opening 163 in the support plate 48'.

The mount component 154 has a U-shaped portion at 164. With the mount component in a selected operative position, spaced legs 166, 168 depend to below the support plate 48', with a base 170 of the "U" overlying the support plate 48' and supported thereagainst.

Figure 24:
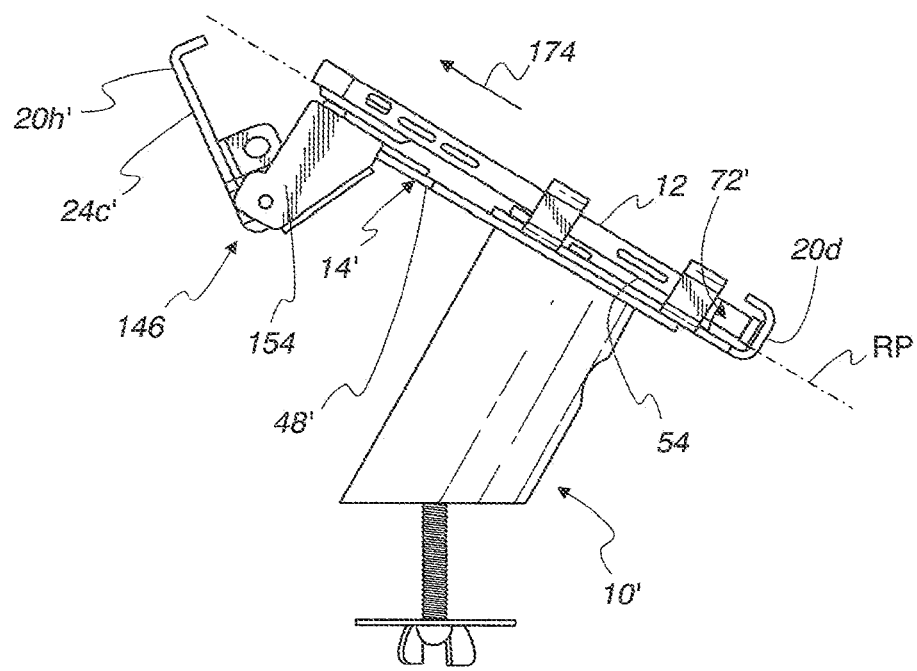
FIG. 24 is a side elevation view of a modified form of support assembly with the portable article in a display position thereon, with another exemplary form of blocking subassembly as depicted schematically in FIG. 23, and with a component on the blocking subassembly in a pre-assembly position.
Figure 25:
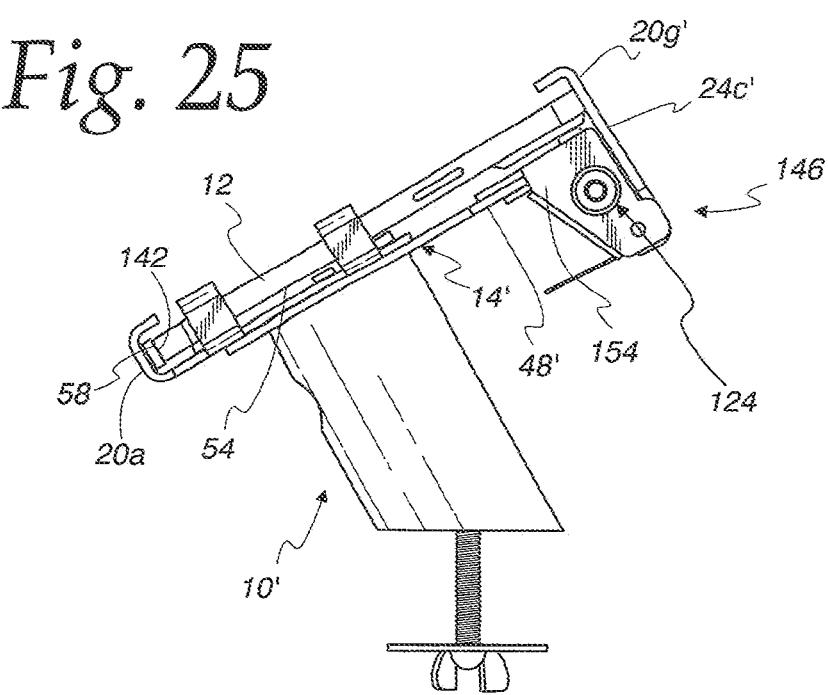
FIG. 25 is a view as in FIG. 24 from an opposite side perspective and with the component on the blocking subassembly in an operative position.

The component 24c' is joined to the mount plate 154 for pivoting movement relative to the frame 14 around a laterally extending axis 172 between a pre-assembly position, as shown in FIG. 24, and an operative position, as shown in FIG. 25. In the pre-assembly position for the component 24c', the arms 20g', 20h' reside in relation to a reference plane RP defined by the rear surface 54 of the article 12 such that the displayed article 12, as seen in FIGS. 24 and 25, can be translated upwardly in the direction of the arrow 174 to be fully separated from the support assembly 10' without being blocked by the component 24c'. With the article in the display position of FIG. 24, and the component 24c' pivoted from the pre-assembly position into the operative position of FIG. 25, the component 24c' performs as the aforementioned component 24c in blocking the article from being withdrawn from the receptacle 72' and separated from the support assembly 10'.

As depicted, the connectors 152a, 152b on the frame 14' each is in the form of a post extendable one each into guide receptacles/connectors 150a, 150b on the legs 166, 168, respectively. The posts 152a, 152b could be independent parts or fixed to either the blocking subassembly 146 or frame 14'. For simplicity, the posts are described as being part of the frame 14'.

The component 24c' carries an L-shaped bracket 176 with a first leg 177 fixed to a wall 178 on the component 24c' and a second, angularly projecting leg 180 which defines an opening 136' to receive the plunger 134 on the locking assembly 124, which is depicted as, but not required to be, the same locking assembly as used on the support assembly 10. The locking assembly 124 can be changed from the unlocked state into the locked state with the component 24c' in the operative position, thereby causing the plunger 134 to be advanced into the opening 136', as an incident of which the component 24c' is maintained in the operative position. This places the support assembly 10' in its secured state.

The mount component 154 supports a pair of resilient members 142 and is configured so that the displayed article overlies and blocks access to the fastener 160, as might otherwise permit loosening thereof.

The remainder of the support assembly 10' may be the same as, or similar to, the support assembly 10.

With the structure described above it is possible to offer a simple setup guide for the support assembly to consistently accommodate different commercially available articles identified by manufacturer and/or model number so that a consistent receptacle size can be pre-set.

Each of the receptacles/openings 26, 96, 156 can be identified with a number on its respective component 24a, 24b, 24c, 24c'. A chart can be provided which identifies which receptacles/openings in each component a respective frame post is to be directed to accommodate particular articles. Starting with the components 24a, 24b in the pre-assembly position of FIG. 3, the components are translated in a first direction to place the posts 28 in the receptacle/opening with the appropriate number. With the components 24a, 24b in the selected operative positions, the fasteners 78 are used to fix the components 24a, 24b on the frame 14.

With the support subassembly 88 separated fully from the frame 14, the component 24c can be attached to the base 90 by projecting the posts 94 into the appropriate, identified receptacles/openings 96. This relationship is maintained by the fastener 98.

With the components 24a, 24b in their operative positions, the article 12 can be translated into the receptacle 72 into its display position.

Once the article 12 is in place, the blocking subassembly 88 can be translated laterally from the pre-assembly position of FIG. 3 to the operative position in exemplary FIG. 11. The locking assembly 124 can then be changed from its unlocked state into its locked state, whereupon the support assembly is in the secured state.

The modified support subassembly 146 has separate associated pre-assembly and operative positions. The support subassembly 146 is press fit from any of multiple pre-assembly positions into respective operative positions. Thereafter, the component 24c' can be pivoted between a pre-assembly position into an operative position, in the latter position blocking the displayed article in its display position.

Figure 28:
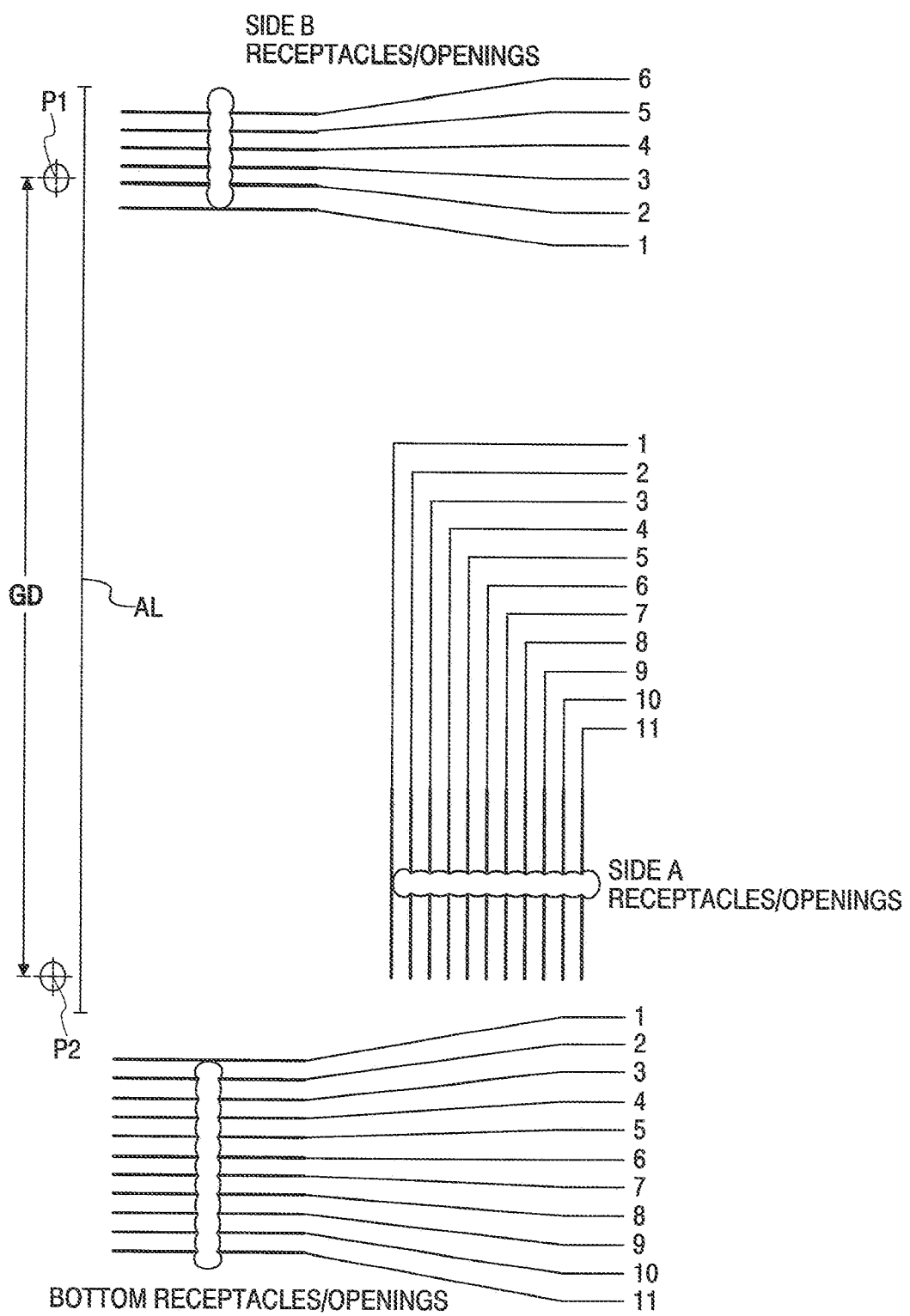
FIG. 28 is a depiction of an exemplary form of template usable to identify dimensions of different portable articles to allow preliminary setup of the inventive support assembly to accept different configurations of portable article.

To facilitate use, a template as shown in FIG. 28 can be provided whereby an unknown model, or one that has no known pre-settings for the components 24a, 24b, 24c, 24c', can be compared to identify the receptacles/openings 26, 96, 156 that should be utilized to consistently configure the article receptacle 72, 72' for optimal security. A gauge dimension GD is identified between points P1, P2 to allow the user to verify that the template is scaled properly.

Using the template with the support assembly 10, a side of the article is placed against an alignment line AL. The opposite side of the article aligns with one of the numbered "side A" receptacles/openings, representing the article width measurement. The article is then translated to match the bottom of the article to the same numbered bottom receptacle/opening as at side A. The top of the article aligns with one of the top receptacles/openings. The three derived numbers are then used to select the correspondingly numbered receptacles/openings to allow press fitting of each of the components 24a, 24b, 24c into an operative position to produce a predetermined optimal configuration to accept the article.

The template can be similarly adapted to facilitate setup of the support assembly 10'.

When it is desired to release the article from the display position on the support assembly 10, certain setup steps are simply reversed. Notably, the locking assembly 124 is changed from the locked state into an unlocked state to release the blocking subassembly 88 that can be slid laterally away from the frame.

Alternatively, with the other forms of the blocking subassembly, the blocking subassembly can be changed from an operative position/state into a pre-assembly position/state to allow the article 12 to be translated out of the receptacle and separated from the support assembly.

The foregoing disclosure of specific embodiments is intended to be illustrative of the broad concepts comprehended by the invention.

The invention claimed is:

1. In combination:
a) a portable article having a body with a peripheral edge; and
b) a support assembly for displaying the portable article, the support assembly comprising:
a frame configured to engage the body so as to support the portable article in a display position; and
a blocking assembly configured to maintain the portable article in the display position,
the blocking assembly comprising a plurality of arms which, with the support assembly in a secured state, cooperatively confine movement of the portable article in the display position relative to the frame,
wherein one of the arms is part of a first component,
wherein there is at least a first connector on the first component and at least a first connector on the frame,
the at least first connector on the first component and the at least first connector on the frame configured so that the first component can be moved in a first direction: a) from a first pre-assembly position, spaced from the frame, towards the frame; and b) into a first operative position to thereby cause the at least first connector on the first component to engage the at least first connector on the frame, the first component, including the at least first connector on the first component, and the frame, including the at least first connector on the frame, configured so that as an incident of the first component moving from the first pre-assembly position into the first operative position, the first component is substantially blocked from translating relative to the frame in a direction transversely to the first direction.

2. The combination according to claim 1 wherein the first component, including the at least first connector on the first component, and the frame, including the at least first connector on the frame, are configured so that as an incident of the first component moving from the first pre-assembly position into the first operative position, the first component is substantially blocked from moving relative to the frame other than by moving the first component relative to the frame oppositely to the first direction.

3. The combination according to claim 2 further comprising at least one fastener for fixing the first component in the first operative position relative to the frame.

4. The combination according to claim 3 wherein the one fastener has an operating portion that is blocked by the portable article with the portable article in the display position.

5. The combination according to claim 1 wherein the first connector on the frame is one of a first post and a first receptacle and the first connector on the first component is the other of a first post and a first receptacle and the first post moves into the first receptacle as an incident of the first component moving from the first pre-assembly position into the first operative position.

6. The combination according to claim 1 wherein the plurality of arms comprises a second arm that is spaced laterally from the one arm with the support assembly in the secured state, wherein the at least first connector on the frame comprises first and second posts, and the at least one connector on the first component comprises first, second, third, and fourth receptacles, wherein the support assembly is configured so that: a) as an incident of the first component moving from the first pre-assembly position into the first operative position the first and second posts move one each into the first and second receptacles, the first component is substantially blocked from moving relative to the frame other than by translating the first component relative to the frame oppositely to the first direction, and the one and second arm are spaced laterally from each other a first distance; and b) as an incident of the first component moving from a second pre-assembly position, spaced from the frame, towards the frame, the first and second posts move one each into the third and fourth receptacles wherein the first component is in a second operative position wherein the first component is substantially blocked from moving relative to the frame other than by moving the first component relative to the frame in a direction opposite to a direction the first component moves from the second pre-assembly position into the second operative position, and the one and second arm are spaced laterally from each other a second distance different than the first distance.

7. The combination according to claim 6 wherein the plurality of arms comprise a plurality of arms on the first component.

8. The combination according to claim 7 wherein the peripheral edge on the portable article includes first and second transverse edge portions and the plurality of arms on the first component comprise a first arm with a surface that faces one of the first and second transverse edge portions and a second arm with a surface that faces the other of the first and second transverse edge portions.

9. The combination according to claim 1 wherein the portable article has a front surface and first and second of the plurality of arms each has a portion that overlies the front surface on the portable article.

10. The combination according to claim 1 wherein the support assembly comprises a second component, one of the arms is part of the second component, wherein there are cooperating connectors on the second component and frame that are configured to be engaged by moving the second component from a pre-assembly position towards the frame as an incident of which the second component realizes an operative position, the second component, the frame, and the cooperating connectors on the frame and second component configured so that with the second component in its operative position the second component is substantially blocked from moving relative to the frame other than by moving the second component in a direction opposite to a direction the second component moves from its pre-assembly position into its operative position.

11. The combination according to claim 10 wherein the second component has a same construction as the first component, with the first and second components being mirror images of each other.

12. The combination according to claim 1 wherein the frame comprises a pedestal and defines a surface against which a back surface of the portable article is placed to support the portable article in the display position.

13. The combination according to claim 12 wherein the support assembly comprises a plurality of resilient members that cooperatively define the frame surface against which the back surface of the portable article is placed with the portable article in the display position.

14. The combination according to claim 1 wherein the portable article has a top and bottom and laterally spaced sides, the support assembly comprises a blocking subassembly with another component, wherein one of the arms is on the another component, wherein there are cooperating connectors on the blocking subassembly and frame that guide relative movement between the frame and blocking subassembly as the blocking assembly is moved from a pre-assembly position into an operative position wherein the one arm on the another component resides at one of the top and bottom of the portable article with the portable article in the display position.

15. The combination according to claim 14 wherein the pre-assembly position for the blocking subassembly is fully spaced from the frame.

16. The combination according to claim 14 wherein with the portable article in the display position, the blocking subassembly is guidingly moved in a lateral direction in moving between the pre-assembly and operative positions for the blocking subassembly.

17. The combination according to claim 14 wherein the support assembly further comprises a locking assembly that has locked and unlocked states, with the blocking subassembly in its operative position and the locking assembly changed from the unlocked state into the locked state, the blocking subassembly is fixed in its operative position.

18. The combination according to claim 14 wherein the blocking subassembly comprises a base to which the another component is mounted, there are cooperating connectors on the base and the another component that allow the another component to be maintained in a plurality of different relative positions in which the one arm has different relationships with the one of the top and bottom of the portable article in the display position.

19. The combination according to claim 18 wherein the cooperating connectors comprise a post on one of the base and the another component and a receptacle for the post on the other of the base and the another component.

20. The combination according to claim 19 wherein the other of the base and the another component has a plurality of receptacles for the post into which the post can be selectively directed to allow selection of different relative positions between the base and the another component.

21. The support assembly for displaying a portable article as recited in claim 1.

* * * * *